Patented Sept. 6, 1938

2,128,925

UNITED STATES PATENT OFFICE 2,128,925

TREATMENT OF SOYA BEAN OIL

Albert K. Epstein, Chicago, Ill.

No Drawing. Application April 15, 1937,
Serial No. 137,045

20 Claims. (Cl. 260—420)

My invention relates to the treatment of certain types of oils, especially soya bean oil, and is particularly concerned with improving the quality thereof whereby its utility in the field of edible oils and fats is markedly increased.

It has been known for some considerable time that edible soya bean oil, including edible soya bean oil which has been refined, bleached and deodorized under the best existing commercial methods, undergoes a type of spoilage which is characterized as "reversion" when exposed to light and air and, even though somewhat more slowly, when stored in the absence of light and air. This reversion manifests itself in an acquisition by the soya bean oil of various off-flavors such as "beany" flavor, or sometimes described as fishy, which subsequently often become intensified and altered with the production of other undesirable flavors described as "oleo" and "grassy" or "fishy". This type of spoilage is characteristic of soya bean oil. Even when edible, refined, bleached and deodorized soya bean oil is subjected to hydrogenation to produce a product having a melting point of from about 95° F. to 100° F., said partially hydrogenated oil also reverts, particularly when exposed to air and light, after a few days and acquires an oleo-like flavor which becomes intensified with time. Even when the oil is kept in the dark, the above type of spoilage occurs in the bean oils in the course of time.

As a result of the disadvantageous properties of soya bean oil, as briefly described above, considerable difficulties and objections have been encountered in utilizing this oil in the food industries, such as in salad oil and particularly in dry plastic shortenings and in margarine. In the manufacture of margarine especially, reversion takes place relatively more quickly because of the presence of moisture and other substances. While there is a decided advantage from an economic standpoint to employ soya bean oil in the food industries, primarily because of the abundance and ready sources and availability of such oil, nevertheless the problems encountered have acted as definite deterrents to the stimulation of such uses of soya bean oil.

I have discovered that, by treating soya bean oil with certain reagents in certain proportions and under proper temperature and pressure conditions, products are obtained which keep in good condition without reversion for periods of time substantially in excess of the time before reversion sets in without the treatment of my invention. The practical effect of this treatment is that the commercial utility of soya bean oil in the food industry is tremendously increased.

The improvement in the soya bean oil by reason of my treatment thereof manifests itself also in other respects, the most notable of which appears to lie in the reduction of color of the treated oil. As will be pointed out more fully hereinafter, in some instances this reduction in color is very substantial.

It is accordingly an object of my invention to improve soya bean oil, particularly to enhance its utility for use in food products.

Another object of my invention concerns itself with substantially extending the stability or "pre-reversion" period of soya bean oil.

Still another object of my invention resides in reducing the color of soya bean oil.

Another object of my invention deals with the provision of a novel method of treating soya bean oil to improve the same, particularly with reference to extending or prolonging the period preceding reversion or, in other words, the pre-reversion period.

Yet another object of my invention is the provision of a novel soya bean oil possessing the property of keeping for relatively long periods of time without development of off-flavors.

Another of the objects of my invention is concerned with the development of a method of treating soya bean oil to improve the same, especially with regard to extending the period preceding reversion, which method may easily be combined and coordinated with present practices in the art of treating edible oils and fats, particularly with respect to the refining thereof.

With these objects in view and others which will appear as the nature of my invention is made clear in the light of the following description, I shall address myself to fully explaining the various phases of my invention.

In general, my invention is predicated on the discovery that when high molecular weight alkyl or acyl derivatives of polyhydroxy substances containing at least one free hydroxy group attached to the polyhydroxy nucleus are added in very small amounts to soya bean oil and the oil is subjected to elevated temperatures, particularly under reduced pressures, in the presence of steam or other non-oxidizing vapor or gas, such as nitrogen or hydrogen, the resulting oil possesses new properties; its pre-reversion period is substantially prolonged and it undergoes a definite reduction in color. The steam or non-oxidizing gas serves to sweep out the volatile constituents of the oil undergoing treatment.

I have found that, in order to achieve my best results, the soya bean oil admixed with the polyhydroxy derivatives must be treated in a non-oxidizing atmosphere such as steam, nitrogen, carbon dioxide or the like, particularly under reduced pressure, and at temperatures of the order of those employed in edible oil deodorization commercial processes, namely, about 420° F. to 500° F., preferably at the higher temperatures. Under these conditions, a reaction evidently takes place between some of the constituents of the soya bean oil and the polyhydroxy derivative and it is my belief that it is this reaction product which forms at the elevated temperatures which is responsible for the prolongation of the good flavor and retards the development of the so-called "beany" or "fishy" flavor in the soya bean oil. The use of elevated temperatures also serves, with the steam or other non-oxidizing gas, to deodorize the bean oil and to volatilize any undersirable constituents formed by the interaction of the polyhydroxy derivative and some of the constituents of said oil. Although I have not yet fully ascertained the mechanism of the reaction which takes place and appears to account for this unusual and unexpected retardation of the development for "beany" or specific off-flavors in the treated soya bean oil, it is my present theory that the polyhydroxy derivative reacts with the conjugated double bonds of the coloring matter, such as carotene, present in the soya bean oil. I postulate this theory because, in general, simultaneously with the improvement of the keeping properties or prolongation of the pre-reversion period of the soya bean oil, there is also a bleaching effect upon or reduction of color of said oil. While I am not to be bound by any theoretical considerations, I have offered the same as a possible explanation of why I obtain the results which I have already generally described and which will be more fully detailed thereinafter. At any rate, that a reaction takes place under the conditions of my treatment cannot be gainsaid since the mere addition of the polyhydroxy derivatives to soya bean oil does not serve noticeably to prolong or extend the pre-reversion period thereof. The polyhydroxy derivatives, used at the high temperatures under the conditions specified, appear to exert a catalytic effect with a resultant marked improvement of the soya bean oil.

The polyhydroxy derivatives which I employ herein are the higher alkyl and acyl derivatives of polyhydroxy substances, particularly water soluble polyhydric alcohols, containing at least one free hydroxy group attached to the polyhydroxy nucleus. In general, these polyhydroxy derivatives may be represented by the general formula

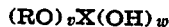

$$(RO)_v X(OH)_w$$

wherein R is a higher molecular weight alkyl or acyl radical, X is a carbon-hydrogen skeleton or residue of the polyhydroxy substance, and $v$ and $w$ are small whole numbers. Among the polyhydroxy derivatives which I can employ for my present purposes and which come within the scope of the general formula set forth hereinabove, are monostearine, mono-palmitin, di-stearine, di-palmitin, mono-olein, di-olein, mono oleic acid ester of diethylene glycol, mono stearic acid ester of diethylene glycol, mono cetyl ether of glycerol, mono-laurin, di-laurin, mono-myristin, di-myristin, mono oleic acid ester of polyglycerols such as diglycerol, mono-oleyl ether of glycerol, and other higher molecular weight alkyl or acyl derivatives of the aforementioned and other polyhydroxy substances including mannitol, sorbitol and the like. It will be understood, of course, that mixtures of many of the above substances may likewise be employed. Indeed, in commercial production of said compounds, particularly the higher molecular weight fatty acid mono- and di-glycerides, in practically all cases the commercial products contain mixtures of mono-glycerides, di-glycerides, and unreacted tri-glycerides, the products being predominantly mono-glycerides or di-glycerides, depending upon the particular reacting conditions, portions of ingredients, and the like, utilized in the process of preparation thereof. The term "higher" as used herein will be understood to mean at least eight carbon atoms.

As source materials for the preparation of, for example, the mono-glycerides and di-glycerides, any of the natural oils and/or fats of commerce may be employed such as cottonseed oil, hydrogenated cottonseed oil, corn oil, sesame oil, coconut oil, lard, soya bean oil, fish oils, and similar oils and fats.

I have obtained excellent results utilizing a mixture of mono-glycerides and di-glycerides prepared as follows:

600 pounds of cottonseed oil hydrogenated to an iodine value of approximately 69 and 150 pounds of normally liquid cottonseed oil are heated together with 250 pounds of glycerol to about 200° F. without stirring. 12 ounces of sodium hydroxide flakes were added and the temperature raised to 485° F. and held at that temperature for two hours with stirring. A non-oxidizing atmosphere, such as $CO_2$, is maintained during the heating and the subsequent cooling, to about 200° F. On standing, glycerol separates out and is removed. Any glycerol which is still suspended may be centrifuged out. The resulting product contains a mixture of mono- and di-glycerides of the fatty acids present in the hydrogenated cottonseed oil and normally liquid cottonseed oil.

Generally speaking, crude soya bean oil, produced by the expeller process or by the solvent process, contains a fraction of one per cent of free fatty acids, this, however, being variable. Such oil is refined in accordance with conventional processes involving neutralization of the free fatty acids with alkali or alkaline materials, removal of the resulting soap, drying, and bleaching with such agents as fuller's earth or carbon black. The oil may then, if desired, be hydrogenated in accordance with known practice to produce a product having a melting point of about 95° F. to 100° F. whereby it may be employed as a constituent of margarine or dry bakery shortenings. If desired, the hydrogenated soya bean oil may be washed again with a slight amount of alkali and introduced into a deodorizing kettle and deodorized with super-heated steam under reduced pressure.

I have found that I obtain excellent results with economy of treatment if the polyhydroxy derivatives, in proper proportions, are added to the soya bean oil just prior to the deodorization thereof with superheated steam under reduced pressure. The subjection of the soya bean oil, admixed with the polyhydroxy derivatives, to these conditions of temperature and reduced pressure produced a definite change in the oil in that some constituent or constituents of the soya bean oil which cause or promote reversion become fixed and inactive while undesirable constituents formed or present become volatilized, thereby producing a product which keeps in good condition for relatively long periods of time without development of oleo-like or fishy or grassy flavors.

It must not be inferred that my process is limited to the treatment of hydrogenated soya bean oil or that the polyhydroxy derivatives must be introduced into the oil at any particular phase of the process of treatment or refining thereof. My process is also applicable to the treatment of liquid or non-hydrogenated soya bean oil. Furthermore, the polyhydroxy derivatives may be added at any suitable stage of the process of treating the soya bean oil. It is only necessary that the mixture of the soya bean oil and the polyhydroxy derivatives be subjected to a temperature sufficiently high to react, as, for example, about 400° F. to 500° F. under reduced pressure for the requisite length of time, which will vary with the size of the batch undergoing treatment, generally a matter of one hour or several hours during which period the oil is also deodorized. While the soya bean oil admixed with the polyhydroxy derivative could be subjected to the heat treatment in an inert or substantially non-oxidizing atmosphere, such as indicated above, followed by steam deodorization under reduced pressure at elevated temperatures of the character described, I have found it to be considerably more economical and somewhat better results are obtained if the treatment is effected as a part of and concomitant with the steam deodorization treatment to which the oils are subjected, the time being sufficiently long, generally six or seven hours in large scale commercial operations, so as to drive off undesirable volatile constituents present in the oil or which might be formed in the reaction.

The following examples are illustrative of methods of practicing my invention. It will be understood, however, that said examples are given by way of illustration only and are not to be construed as limitative of the full scope of my invention as taught herein.

*Example A*

To a partially hydrogenated soya bean oil having a melting point of 100° F. there was added 0.05% by weight of monostearin and the mixture was heated with superheated steam for six hours at a temperature of 495° F. at an absolute pressure of 7 mm. of mercury to remove undesired volatile constituents. In an accelerated test made by placing a sample of the oil thus treated in a bottle and exposing it to light, the oil kept in good condition for nine days. A batch similarly treated but omitting the monostearin, or in other words the blank, kept only two days before reversion set in under the same accelerated test.

*Example B*

Crude soya bean oil was refined in the conventional way by neutralization with alkali, removal of the resulting soap, drying and bleaching. It was then mixed with 0.1% by weight of the mixture of cottonseed oil monoglycerides and diglycerides prepared as described above and the mixture was heated at 500 degrees F. at an absolute pressure of 6.5 mm. of mercury for a period of several hours until undesired volatile constituents were removed. In an accelerated test, as described in Example A, the oil thus treated kept in good condition for 17 days as against 3 days for a batch similarly treated but without the addition of the monoglycerides and diglycerides.

*Example C*

To a soya bean oil partially hydrogenated so that it had a melting point of between 95 degrees F. and 100 degrees F. there was added 0.1% by weight of mono-olein. The resulting mixture was then heated at 500 degrees F. with superheated steam under an absolute pressure of 7 mm. of mercury for seven hours to remove undesired volatile constituents. In an accelerated test, as described in Example A, the treated oil had keeping qualities superior to a sample similarly treated but without the addition of the mono-olein.

The proportions of the polyhydroxy derivatives employed are generally somewhat critical. In general I have found that if substantially in excess of 0.3% of the polyhydroxy derivative, based on the weight of the soya bean oil, is employed the results obtained are not quite so satisfactory as when small proportions are utilized. In those cases where increased amounts of the polyhydroxy derivatives are not positively detrimental, their use ordinarily is not justified since smaller amounts function just as effectively at less cost. The proportions vary somewhat with particular soya bean oils and, as a general rule, liquid soya bean oil requires greater proportions of the polyhydroxy derivatives than is required in the treatment of hydrogenated or partially hydrogenated soya bean oil. Moreover, it will be appreciated that the various polyhydroxy derivatives possess varying efficacies which obviously affects the amounts to be employed for optimum results. In general, bearing in mind the statements made above and the variability of different factors, I employ proportions ranging between about 0.01% and 0.3% of the polyhydroxy derivatives, and preferably from 0.05% to 0.1%.

I have referred hereinabove to the temperatures which are utilized in my process. It is evident that any temperature, sufficiently high to effect the reaction between the polyhydroxy derivatives and the soya bean oil but not so high as to have an undesirable effect on the oil or to cause objectionable decomposition to take place, may be employed. I have stated that temperatures of 400° F. to 500° F. have proven satisfactory. Excellent results have been obtained at about 430° F. to 500° F. In general, to reiterate, the temperature must be high enough to volatilize, with the superheated steam or the like, the undesirable volatile constituents present in the oil and those which may be formed as reaction products.

The degree of vacuum utilized is, of course, subject to variation. Excellent results have been obtained with absolute pressures of 6.5 mm. to 15 mm. of mercury but the operative range extends beyond either limit. In general, other things being equal, at low pressures the quality of the products obtained is an inverse function of the pressure, i. e., the lower the pressure, the better the product.

As I have previously stated, concomitantly with the extension or prolongation of the pre-reversion period of the soya bean oil as a result of my treatment, there is, as a general rule, a reduction in color over and above that which is due to the steam deodorization treatment in those instances where I utilize my process in conjunction therewith. For example, with some partially hydrogenated soya bean oils having a melting point of about 100° F., the color has been reduced by my treatment from about 13 yellow and 1.3 red (Lovibond scale) to from 4 to 3 yellow and about 0.4 to 0.3 red. In some cases of the treatment of liquid soya bean oil, my process has reduced the color from 35 yellow and 8 red to 6 to 7 yellow and 0.5 red. I have found that some types of soya bean oil undergo somewhat of a bleaching or reduction in color during steam deodorization thereof when the polyhydroxy derivatives are not employed. However, such oils acquire a beany, fishy, grassy or oleo-like flavor relatively quickly. If, however, as I have described, the same oil is subjected to the same temperature and deodorization treatment but in the presence of the polyhydroxy derivatives incorporated therein prior to subjection to deodorization, there is an improvement not only in color but also in the keeping properties of the oil.

What I claim as new and desire to protect by Letters Patent of the United States is:

1. In a method of improving soya bean oil, particularly with respect to extending its pre-reversion period, the steps which comprise mixing said oil with not substantially in excess of 0.3%, based on the weight of the oil, of a higher molecular weight alkyl or acyl derivative of an aliphatic polyhydroxy substance containing at least one free hydroxy group attached to the polyhydroxy nucleus, and heating the resulting mixture under reduced pressure at sufficiently high edible oil deodorization temperatures for a length of time sufficient to drive off undesirable constituents.

2. In a method of improving soya bean oil, particularly with respect to extending its pre-reversion period, the steps which comprise mixing said oil with between about 0.5% and 0.3%, based on the weight of the oil, of a higher molecular weight alkyl or acyl derivative of an aliphatic polyhydroxy substance containing at least one free hydroxy group attached to the polyhydroxy nucleus, and heating the resulting mixture under reduced pressure at a temperature between about 400° F. and 500° F. for a length of time sufficient to substantially deodorize the oil.

3. In a method of improving soya bean oil, particularly with respect to extending its pre-reversion period, the steps which comprise mixing said oil with not substantially in excess of 0.3%, based on the weight of the oil, of a higher molecular weight alkyl or acyl derivative of an aliphatic polyhydroxy substance containing at least one free hydroxy group attached to the polyhydroxy nucleus, and heating the resulting mixture under reduced pressure and in the presence of superheated steam at edible oil deodorization temperatures for a length of time sufficient to substantially deodorize the oil.

4. In a method of improving soya bean oil, particularly with respect to extending its pre-reversion period, the steps which comprise mixing said oil with between about 0.05% and 0.3%, based on the weight of the oil, of a higher molecular weight alkyl or acyl derivative of an aliphatic polyhydroxy substance containing at least one free hydroxy group attached to the polyhydroxy nucleus, and heating the resulting mixture under reduced pressure and in the presence of superheated steam at edible oil deodorization temperatures for a length of time sufficient to substantially deodorize the oil.

5. The process of claim 1 wherein the derivative is a higher fatty acid ester of glycerol containing at least one free glycerol hydroxy group.

6. The process of claim 4 wherein the derivative is a higher fatty acid ester of glycerol containing at least one free glycerol hydroxy group.

7. The process of claim 1 wherein the soya bean oil, prior to treatment with the polyhydroxy substance, has been at least partially refined and hydrogenated.

8. The process of claim 4 wherein the soya bean oil, prior to treatment with the polyhydric alcohol, has been at least partially refined and hydrogenated.

9. The process of claim 4 wherein the derivative is a higher fatty acid monoglyceride or diglyceride or mixture thereof resulting from the re-esterification of a triglyceride oil or fat with glycerol.

10. The process of claim 4 wherein the derivative comprises monostearin.

11. Soya bean oil, having an improved color and a substantially extended pre-reversion period, comprising the reaction product, under reduced pressure and at deodorization temperatures, of soya bean oil and not substantially in excess of 0.3%, based on the weight of said oil, of a higher molecular weight alkyl or acyl derivative of an aliphatic polyhydroxy substance containing at least one free hydroxy group attached to the polyhydroxy nucleus.

12. Soya bean oil, having an improved color and a substantially extended pre-reversion period, comprising the reaction product, under reduced pressure, in the presence of super-heated steam, and at deodorization temperatures, of soya bean oil and between about 0.05% and 0.3%, based on the weight of said oil, of a higher molecular weight alkyl or acyl derivative of an aliphatic polyhydroxy substance containing at least one free hydroxy group attached to the polyhydroxy nucleus.

13. Soya bean oil, having an improved color and a substantially extended pre-reversion period, comprising the reaction product, under reduced pressure and at deodorization temperatures, of soya bean oil and not substantially in excess of 0.3%, based on the weight of said oil, of a higher fatty acid ester of glycerol containing at least one free glycerol hydroxy group.

14. Partially hydrogenated soya bean oil, having an improved color and a substantially extended pre-reversion period, comprising the reaction product, under reduced pressure and at deodorization temperatures, of soya bean oil and not substantially in excess of 0.3%, based on the weight of said oil, of a higher fatty acid monoglyceride or diglyceride or mixture thereof resulting from the re-esterification of a triglyceride oil or fat with glycerol.

15. Partially hydrogenated soya bean oil, having an improved color and a substantially extended pre-reversion period, comprising the reaction product, under reduced pressure, in the presence of super-heated steam, and at deodorization temperatures, of soya bean oil and between about 0.05% and 0.3%, based on the weight of said oil, of a fatty acid ester of glycerol containing at least one free glycerol hydroxy group, the fatty acid radical of said ester containing from 12 to 18 carbon atoms.

16. The method of improving liquid or partially hydrogenated soya bean oil, particularly with respect to extending its pre-reversion period, which comprises mixing said oil with not substantially in excess of 0.1% of a higher fatty acid ester of glycerol containing at least one free glycerol hydroxy group, and heating the resulting mixture under an absolute pressure of about 6.5 mm. to 15 mm. of mercury at a temperature of between about 400° F. and 500° F. for several hours in the presence of superheated steam to remove volatile constituents, the percentage of said ester being based on the weight of the oil.

17. The method of improved soya bean oil, particularly with respect to extending its pre-reversion period, which comprises mixing said oil with between about 0.05% and 0.1%, based on the weight of the oil, of a mixture of monoglycerides and diglycerides resulting from re-esterification of cottonseed oil with glycerol, and heating the resulting mixture under reduced pressure at a temperature between about 400° F. and 500° F. for several hours in the presence of superheated steam to remove volatile constituents.

18. Liquid or at least partially hydrogenated soya bean oil, having improved color and a substantially extended pre-reversion period, comprising the reaction product, under reduced pressure in the presence of superheated steam and at temperatures between 400° F. and 500° F., of soya bean oil and between about 0.05% and 0.1%, based on the weight of the oil, of a mixture of monoglycerides and diglycerides resulting from re-esterification of cottonseed oil with glycerol.

19. In a method of improving soya bean oil, particularly with respect to extending its pre-reversion period, the steps which include mixing said oil with from about 0.05% to 0.3%, based on the weight of the oil, of a higher fatty acid monoglyceride, diglyceride or mixtures thereof, and heating the resulting product in a substantially non-oxidizing atmosphere at a temperature of the order of about 400° F. to 500° F. for a substantial period of time.

20. In a method of improving soya bean oil, particularly with respect to extending its pre-reversion period, the steps which comprise mixing said oil with between about 0.05% and 0.3%, based on the weight of the oil, of higher fatty acid monoglycerides, diglycerides, or mixtures thereof, and heating the resulting product under an absolute pressure of about 6.5 mm. to 15 mm. of mercury at a temperature of about 475° F. to 500° F. for several hours in the presence of superheated steam to effect a reaction between the monoglycerides, diglycerides, or mixtures thereof and the oil or a constituent thereof and to remove volatile constituents.

ALBERT K. EPSTEIN.